United States Patent
Ravnitzki et al.

(12)

(10) Patent No.: US 6,510,170 B1
(45) Date of Patent: Jan. 21, 2003

(54) SYSTEM AND METHOD FOR AMPLIFICATION OF A LASER BEAM

(75) Inventors: Gad Ravnitzki, Moshav Beit Oved (IL); Nisim Zafrani, Bnei Brak (IL)

(73) Assignee: ELOP Electro-Optic Industrial Ltd., Rehovot (IL)

( * ) Notice: Subject to any disclaimer, the term of this patent is extended or adjusted under 35 U.S.C. 154(b) by 0 days.

(21) Appl. No.: 09/433,939

(22) Filed: Nov. 4, 1999

(30) Foreign Application Priority Data

Nov. 5, 1998 (IL) .................................................. 126915

(51) Int. Cl.[7] ................................................. H01S 3/08
(52) U.S. Cl. ......................... 372/106; 372/93; 372/105; 372/107; 359/334
(58) Field of Search ............................ 372/24, 93, 98, 372/106, 107, 9, 33, 68, 105, 334

(56) References Cited

U.S. PATENT DOCUMENTS

| | | | | |
|---|---|---|---|---|
| 4,546,477 A | * | 10/1985 | Richards | 372/12 |
| 4,731,788 A | * | 3/1988 | Shoshan | 372/9 |
| 5,018,163 A | * | 5/1991 | Daunt et al. | 372/68 |
| 5,504,763 A | * | 4/1996 | Bischel et al. | 372/33 |
| 5,949,546 A | * | 9/1999 | Lee et al. | 356/492 |
| 6,069,730 A | * | 5/2000 | Injeyan et al. | 359/334 |

* cited by examiner

*Primary Examiner*—Paul Ip
*Assistant Examiner*—Cornelius H. Jackson

(57) ABSTRACT

The invention provides a laser system for producing a high energy amplified laser beam output from an oscillator producing a wave front of low energy laser beam, the system including at least one amplifier positioned to receive the low energy laser beam for amplification via a first polarizer; a second polarizer, positioned along the axis of the amplified beam at the output side of the amplifier, for allowing a first fraction of the beam to pass therethrough and for reflecting a second fraction of the beam from an output surface of the polarizer, the second fraction constituting the output of the system; a retroreflector, associated with a quarter wave plate, oriented to receive the first fraction and to reflect it back toward the second polarizer, and reflecting means for reflecting the reflected first fraction toward the first polarizer to be reflected toward the amplifier for further amplification and to be reflected off the output surface of the second polarizer together with the second fraction. A method for amplifying a laser beam is also described.

10 Claims, 2 Drawing Sheets

SYSTEM AND METHOD FOR AMPLIFICATION OF A LASER BEAM

FIELD OF THE INVENTION

The present invention relates to a laser system consisting of an oscillator and laser amplifier, and using double or multiple passes in the amplifier for achieving efficient high energy amplification. More particularly, the present invention is concerned with systems and methods utilizing reflecting means including a phase conjugate mirror for achieving high energy and efficient multipassage amplification.

BACKGROUND OF THE INVENTION

High power lasers are of a design including a master oscillator and a power amplifier. Usually, in order to efficiently extract the power stored in the amplifier rod, two or more amplifying passes are needed. In such a system, the beam passes through the amplifier in two directions, and polarization output coupling is required for extracting the laser beam.

FIG. 1 (prior art) illustrates a laser system with an oscillator/amplifier and a phase conjugate mirror. This known system is arranged in a manner utilizing a faraday isolator rotator 2 placed between an oscillator 4 and amplifier 6 to divert the reflected beam from the oscillator. The laser beam from oscillator 4 passes through polarizer 8, interposed between the oscillator 4 and isolator/rotator 2 as a linearly polarized beam toward the faraday isolator/rotator 2. The faraday isolator/rotator 2 rotates the angle of polarization by 45°, and a second polarizer 10, which is in position to pass the laser beam in the new direction of polarization, routes the beam toward amplifier 6. The beam, amplified as it passes through the amplifier 6, is circularly polarized by a quarter wave plate 12 and focused into a non-linear medium by a focusing lens 14 before entering a phase conjugate mirror 16. The phase conjugate mirror 16 retroreflects the input laser beam back through the lens 14 and converts it back to linear polarization but rotated 90° with respect to incident polarization by the quarter wave plate 18. The double amplified laser beam 18 which is the output of amplifier 6 is reflected by polarizer 10 out of the laser system. The fraction of the beam that has been affected by the amplifier birefringence will pass through the polarizer to the faraday isolator/rotator 2, which rotates its linear polarization by 45°, and polarizer 8 reflects it out of the system in a different direction 20 from the direction of the output laser beam 18.

When the direction of the beam is toward the oscillator 4, there is a risk that a part of the laser beam will return and enter into the oscillator, thereby affecting the performance of the laser, or even damaging optical elements of the oscillator. This problem is even more acute when solid state lasers are used, as a result of thermal effects. At high average input powers, the non-uniform temperature distribution in the amplifier rod induces significant birefringence via thermally induced stresses. Such thermal birefringence can lead to strong depolarization of the laser radiation, so that a significant fraction of the amplified beam goes into the oscillator. In order to prevent same, an optical isolator must be inserted between the oscillator and the amplifier. The isolator diverts the fraction of the beam which has the wrong polarization away from the oscillator, but in a direction different from the original beam direction, resulting in reduction of the laser's efficiency.

Several solutions to the thermally induced problem of birefringence have been proposed over the years, but none has ever performed reliably enough, or been deemed sufficiently practical, to receive widespread acceptance in the solid-state laser community. An example of such a solution, called the "Scott & dewitt scheme," is illustrated in FIG. 2.

In this prior art scheme as shown in FIG. 2, the partially depolarized beam from the first amplifier 6 passes through a rotator 22, which rotates the polarization of the beam by 90° and passes the rotated beam through the second amplifier 24. To the extent that the two amplifier rods are identical, the birefringence induced by the rod of the first amplifier 6 is canceled by the rod of the second amplifier 24. At the output of amplifier 24, the beam is linearly polarized in a direction rotated by 90° from the output beam of the oscillator 4. The beam polarization is made circularly by a quarter wave plate 12, and enters the phase conjugate mirror 15 via focusing lens 14. The phase conjugate mirror 16 retroreflects the input laser beam back through the lens 14. The beam is turned back to linear polarization but rotated at 90° with respect to the incident polarization by quarter wave plate 12 and is amplified by the two amplifiers 24 and 6. The induced birefringence is reduced in the same way as in the first pass. The twice amplified laser beam output from amplifier 6 is reflected by the polarizer 10 and exits the laser system as beam 18 after it has been polarization rotated by 90°.

The above-described scheme attempts to eliminate birefringence effects by placing a 90° rotator (plate 22) between two identical laser rods of amplifiers 6 and 24. The idea is that, to the extent that the two rods are identical, the birefringence induced by one rod is canceled by the other. However, the success of this solution varies in consideration of heating non-uniformities and other practical issues related to the requirement that the rods be identical; for example, if, for any reason, one of the amplifier's rods has to be changed, both rods must be changed at the same time, to assure identicality. In addition, this system requires the use of two amplifiers.

SUMMARY OF THE INVENTION

It is therefore a broad object of the present invention to ameliorate the disadvantages of the prior art systems and to provide a laser amplification system and method for efficiently effecting multiple pass amplification.

It is a further object of the present invention to provide a system and method for effecting an unidirectional, multiple pass amplification of a laser beam through one or more amplifiers.

In accordance with the present invention, there is therefore provided a laser system for producing a high energy amplified laser beam output from an oscillator producing a wave front of low energy laser beam, said system comprising at least one amplifier positioned to receive said low energy laser beam for amplification via a first polarizer; a second polarizer, positioned along the axis of the amplified beam at the output side of said amplifier, for allowing a first fraction of the beam to pass therethrough and for reflecting a second fraction of said beam from an output surface of said polarizer, said second fraction constituting the output of the system; a retroreflector, associated with a quarter wave plate, oriented to receive said first fraction and to reflect it back toward said second polarizer; reflecting means for reflecting said reflected first fraction toward said first polarizer to be reflected toward said amplifier for further amplification and to be reflected off the output surface of said polarizer together with said second fraction.

The invention further provides a laser system for producing a high energy amplified laser beam output from an oscillator producing a wave front of low energy laser beam, said system comprising at least a first and a second amplifiers disposed in non-axial relationship to each other, said first amplifier being positioned to receive said low energy laser beam for amplification via a first polarizer; reflecting means for reflecting the amplified beam of said first amplifier toward the input side of said second amplifier; a second polarizer, positioned along the axis of said second amplifier at the output side thereof, for allowing a first fraction of the beam to pass therethrough and for reflecting a second fraction of said beam from an output surface of said second polarizer, said second fraction constituting the output of the system; and a retroreflector associated with a quarter wave plate, oriented to receive said first fraction and to reflect it back toward said first polarizer, to be reflected thereby toward said first amplifier for further amplification by said first and second amplifiers, and to be reflected off the output surface of said second polarizer together with said second fraction.

The invention still further provides a method for amplifying a laser beam, said method comprising directing a laser beam via a first polarizer toward the input side of at least a single amplifier, to be amplified; passing a first fraction of the amplified beam via a second polarizer toward a retroreflector including a quarter wave plate and allowing a second fraction of said beam to be reflected from an output surface of said second polarizer, said second fraction constituting the output of the system, and reflecting said first fraction toward said first polarizer via a quarter wave plate to be rotated and, in turn, to be reflected toward the input side of said amplifier for further amplification, in the same direction of amplification of said laser beam, and to be reflected off the output surface of said second polarizer together with said second fraction.

The invention yet further provides a method for amplifying a laser beam, comprising directing a laser beam to be amplified via a first polarizer toward the input side of a first amplifier; reflecting the amplified beam toward the input side of a second amplifier for further amplification; directing the further amplified beam toward a second polarizer, allowing the passing therethrough of a first fraction of said further amplified beam and reflecting a second fraction of said beam off an output surface thereof, said output surface constituting the output of the system; reflecting said first fraction back toward said second polarizer via a quarter wave plate to be rotated and, in turn, to be reflected toward the input side of said. first amplifier for still further amplification by said first and second amplifiers, and to be eventually reflected off the output surface of said second polarizer together with said second fraction.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic representation of a first prior art system for laser beam amplification;

FIG. 2 is a schematic representation of a second prior art system for laser beam amplification;

Figure 3:
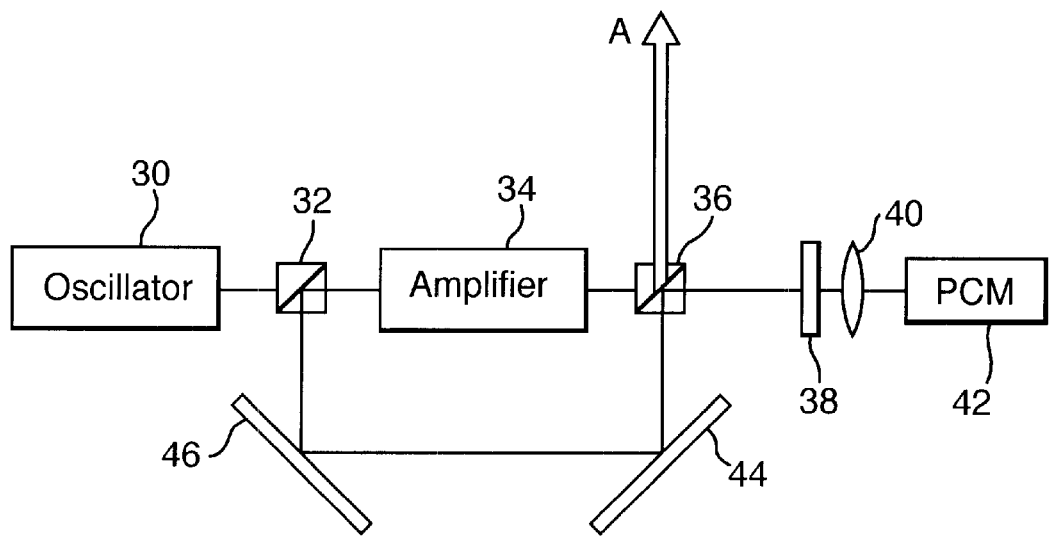
Figure 4:
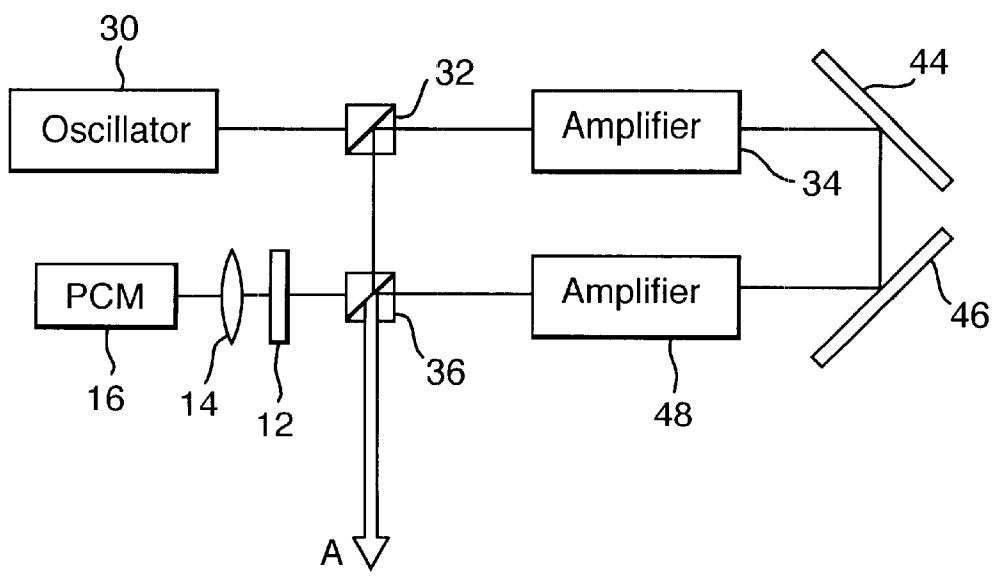

FIG. 3 schematically illustrates a first embodiment of a system for laser beam amplification according to the present invention, and FIG. 4 schematically illustrates a second embodiment of a system for laser beam amplification according to the present invention.

DETAILED DESCRIPTION OF PREFERRED EMBODIMENTS

There is illustrated in FIG. 3 a first embodiment of a system for amplifying a laser beam, utilizing a single amplifier and amplifier rod. Naturally, more than a single amplifier may be used. According to the invention, a linear, polarized beam from an oscillator 30 passes through a polarizer 32 to a power amplifier 34. At the output of amplifier 34, a second polarizer 36 reflects the fraction of the beam that is affected by the induced birefringence in the direction of arrow A, constituting the output from the system. The main fraction of the beam which is linearly polarized, passes through the polarizer 36, the quarter wave plate 38 and the focusing lens 40 to the phase conjugate mirror (PCM) 42. The circularly polarized beam is retroreflected from mirror 42 and, after a second pass through the quarter wave plate 38, it is turned back to linear polarization, but rotated at 90° with respect to the incident polarization. The beam is reflected by the polarizer 36 toward a pair of reflecting means or mirrors 44 and turn 46, which routes the beam toward the polarizer 32. The beam is then reflected from polarizer 32 to a second passage through amplifier 34, and the amplified beam is reflected as an output laser beam at the direction of arrow A by the polarizer 36. The fraction of the beam that is affected by the birefringence in the second passage, passes through polarizer 36, effects a third passage, and is eventually reflected out in the direction of the output beam.

It should be noted that instead of the above-described specific reflecting means, any other suitable corresponding means, such as prisms or corner cubes, may just as well be used.

Figure 1:
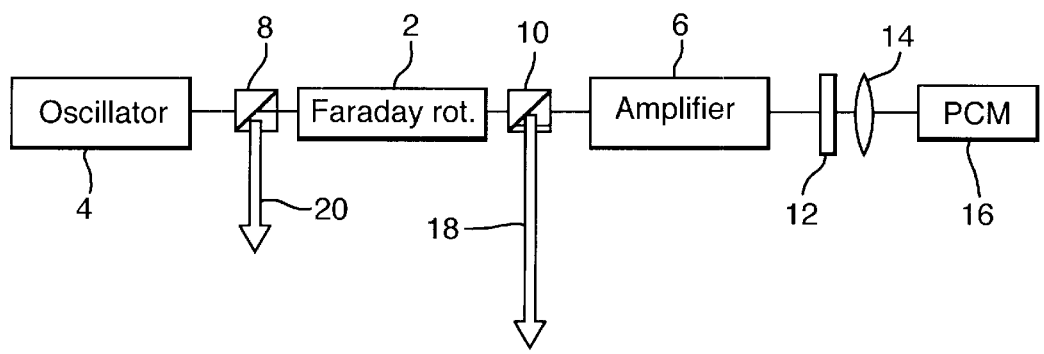
Figure 2:
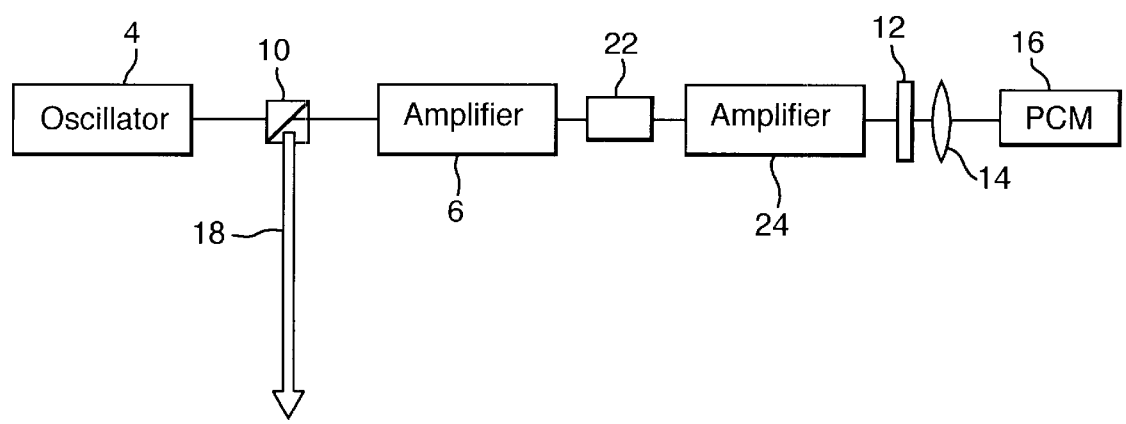

There are two basic advantages to this system:
1) A full protection of the oscillator 30 is achieved, without the need to use an isolator (see isolator/rotator 2 of FIGS. 1 and 2), and
2). The amount of useful extracted energy is increased, thus increasing the laser system's efficiency.

FIG. 4 illustrates a second embodiment of the present invention, having two amplifiers and amplifier rods. The beam at the output of the first amplifier 34 is reflected by a pair of mirrors 44 and in turn 46 toward a second amplifier 48. The polarizer 36 reflects the depolarized fraction of the beam in the direction of arrow A of the output beam, and the main fraction of the beam passes through the polarizer as a linear polarized beam. The beam passes toward the phase conjugate mirror 16 and retroreflects back as a linear polarized beam, but rotated at 90° with respect to the incident polarization by passing twice through the quarter wave plate 12. The polarizer 36 reflects the beam toward the first polarizer 32, which reflects the beam again into the two amplifiers 34 and in turn 48, thus reflecting the beam in the same direction as that of the first pass. The double pass amplified beam is reflected as an output laser beam in the direction of arrow A by the polarizer 36. The fraction of beam that is affected by the birefringence in the second pass, passes through polarizer 36 and effects a third passage, and is reflected out in the direction of arrow A of the output beam.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A laser system for producing a high energy amplified laser beam output from an oscillator producing a wave front of low energy laser beam, said system comprising:

at least one amplifier positioned to receive said low energy laser beam for amplification in a first direction via a first polarizer;

a second polarizer, positioned along an axis of the amplified beam at an output side of said amplifier, said second polarizer allowing a first fraction of the amplified beam to pass therethrough and reflecting a second fraction of said amplified beam from an output surface of said polarizer;

a retroreflector, associated with a quarter wave plate, oriented to receive said first fraction of the amplified beam and to reflect said first fraction of the amplified beam back toward said second polarizer as a reflected first fraction; and reflecting means for reflecting said reflected first fraction toward said first polarizer and directing said reflected first fraction into said amplifier for further amplification in said first direction, wherein a further amplified reflected first fraction is reflected from the output surface of said second polarizer together with said second fraction of the amplified beam as an output of the system.

2. A laser system for producing a high energy amplified laser beam output from an oscillator producing a wave front of low energy laser beam, said system comprising:

a first and a second amplifier disposed in non-axial relationship to each other, said first amplifier being positioned to receive said low energy laser beam for amplification in a first direction via a first polarizer;

reflecting means for reflecting a first amplified beam of said first amplifier toward an input side of said second amplifier;

a second polarizer, positioned along an axis of said second amplifier at an output side thereof, said second polarizer allowing a first action of a second amplified beam provided by said second amplifier to pass therethrough in a second direction and reflecting a second fraction of said second amplified beam from an output surface of said second polarizer; and a retroreflector associated with a quarter wave plate, said retroflector and quarter wave plate being oriented to receive said first fraction of the second amplified beam and to reflect said first fraction of the second amplified beam back toward said first polarizer, said first fraction of the second amplified beam being reflected toward said first amplifier for a further amplification by said first and second amplifiers in said first direction and said second direction, respectively, wherein a further amplified beam provided by said first and second amplifiers is reflected from the output surface of said second polarizer together with said second fraction of said second amplified beam as an output of the system.

3. The laser system as claimed in claim 1 or claim 2, wherein said first fraction of said beam is linearly polarized in said second polarizer in a direction substantially similar to that of said first polarizer.

4. The laser system as claimed in claim 1 or claim 2, wherein said second fraction of said beam is affected by birefringence and is polarized in said second polarizer in a direction different from that of said first polarizer.

5. The laser system as claimed in claim 1 or claim 2, wherein said retroreflector includes a focusing lens interposed between said quarter wave plate and a phase conjugate mirror.

6. The laser system as claimed in claim 1 or claim 2, wherein said reflecting means comprises reflecting mirrors.

7. The laser system as claimed in claim 1 or claim 2, wherein said reflecting means comprises prisms or corner reflecting means.

8. A method for amplifying a laser beam, said method comprising:

directing a laser beam via a first polarizer toward an input side of an amplifier and producing an amplified beam in a first direction;

passing a first faction of the amplified beam via a second polarizer toward a retroreflector including a quarter wave plate and reflecting a second fraction of said amplified beam from an output surface of said second polarizer;

reflecting said first fraction of said amplified beam toward said first polarizer via a quarter wave plate;

rotating a phase of said first fraction of said amplified beam and reflecting a phase rotated first fraction toward an input side of said amplifier;

further amplifying the phase rotated first fraction in said first direction; and reflecting a further amplified beam from the output surface of said second polarizer together with said second fraction of said amplified beam as an output of the system.

9. The method as claimed in claim 8, wherein said first fraction is reflected toward said first polarizer via said second polarizer and further reflecting means.

10. A method for amplifying a laser beam, comprising:

directing a laser beam via a first polarizer toward an input side of a first amplifier in a first direction;

reflecting a first amplified beam toward an input side of a second amplifier in a second direction;

directing a second amplified beam toward a second polarizer, allowing the passing therethrough of a first fraction of said second amplified beam, and reflecting a second fraction of said second amplified beam from an output surface of said second polarizer; and reflecting said first fraction back of said second amplified beam toward said second polarizer via a quarter wave plate, rotating a phase of said first fraction of said second amplified beam, and reflecting a phase rotated first fraction toward the input side of said first amplifier;

further amplifying said phase rotated first fraction in said first and second amplifiers in the first and the second directions, respectively; and reflecting a further amplified beam from the output surface of said second polarizer together with said second fraction of said second amplified beam as an output of the system.

* * * * *